J. S. RICHARDS.
PICKING MACHINE.
APPLICATION FILED AUG. 9, 1907.
946,273.
Patented Jan. 11, 1910.
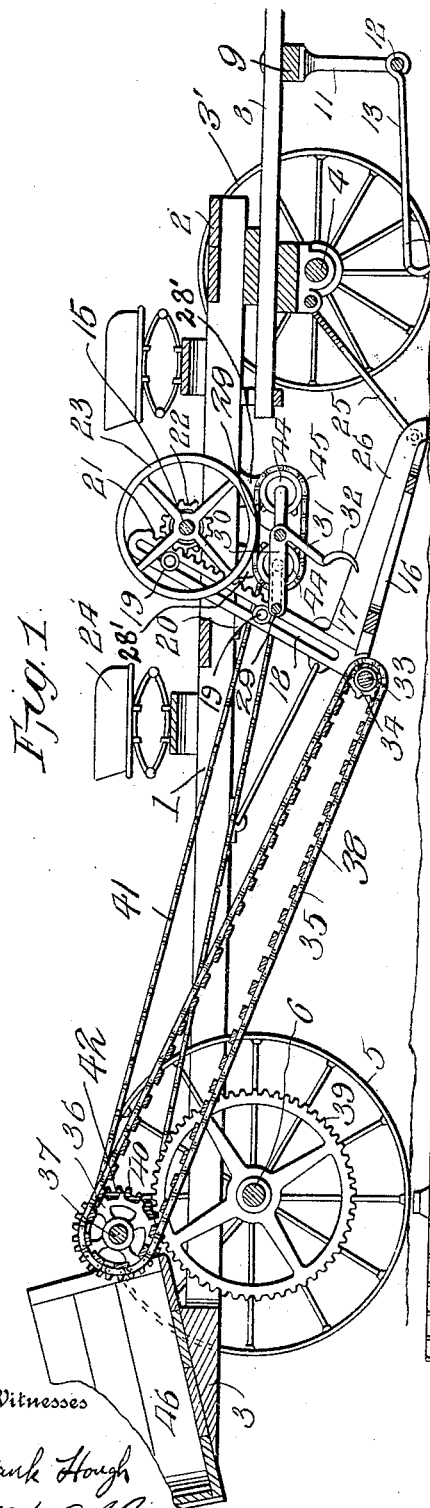
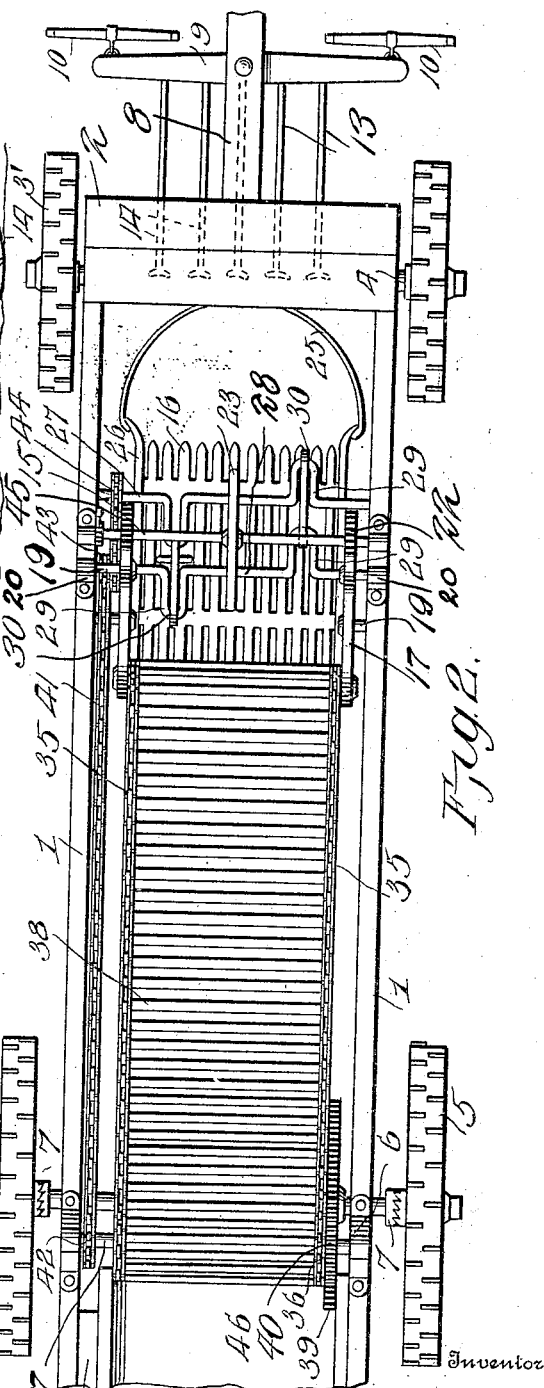
Witnesses
Frank Hough
K. Allen
Inventor
John S. Richards,
By Victor J. Evans
Attorney

UNITED STATES PATENT OFFICE.

JOHN S. RICHARDS, OF MONTEER, MISSOURI.

PICKING-MACHINE.

946,273.  Specification of Letters Patent.  Patented Jan. 11, 1910.

Application filed August 9, 1907. Serial No. 387,893.

*To all whom it may concern:*

Be it known that I, JOHN S. RICHARDS, a citizen of the United States, residing at Monteer, in the county of Shannon and State of Missouri, have invented new and useful Improvements in Picking-Machines, of which the following is a specification.

The invention relates to a stone picking machine adapted for the automatic removal of the stones from a field in preparing the field for agricultural purposes.

The main object of the present invention is the provision of a machine of this class so constructed and arranged that the stones may be readily dislodged from the earth in which they are embedded, picked up on a platform, and forced rearwardly on the same to a traveling carrier, from which latter the stone may be deposited in any suitable receptacle.

The invention will be described in the following specification, reference being had particularly to the accompanying drawings, in which:—

Figure 1 is a longitudinal section of a machine constructed in accordance with my invention, Fig. 2 is a plan of the same.

Referring particularly to the drawings, my improved machine comprises a skeleton main frame including side bars 1 connected at their respective ends by a forward platform 2 and a rear cross bar 3. The main frame is supported at the forward end on forward ground wheels 3', mounted upon an axle 4 secured in a hanger depending from the main frame, and at the rear end by rear ground wheels 5 mounted upon an axle 6, supported in hangers depending from the main frame. The rear ground wheels are loosely mounted on the axle, and are connected thereto through the medium of clutches 7, so arranged that in the forward movement of the wheels the axle will be revolved, while the rearward movement of the wheels will not affect the axle. A draft bar or tongue 8 is connected to the forward portion of the frame, being provided with the usual double-tree bar 9, terminally provided with swingle-trees 10 for connection of the usual draft animals to the machine. Depending from the double-tree 9 is a hanger 11, carrying at the lower end a transversely disposed shaft 12, and on said shaft are loosely mounted a series of diggers 13. The diggers comprise bar-like members provided at their rear or free terminals with inverted U-shaped sections 14 having sharpened points arranged to enter the ground and displace the stones therefrom. Any number of diggers may be provided, it being simply necessary that they be in sufficient number to thoroughly search the ground in advance of the operative portions of the machine.

In rear of the diggers the main frame is provided with a transversely arranged shaft 15, preferably mounted in bearings supported upon the upper portions of the side bars. Below the shaft 15 is arranged the directing platform, preferably comprising a series of parallel spaced bars 16 pointed at their forward ends and connected at their rear ends to a cross bar, which is terminally provided at each end with an upright 17 formed with a longitudinally disposed slot 18. The uprights 17 project upwardly from and at an angle to the plane of the platform, being guided in their longitudinal movement by pins 19 extending from brackets 20 secured on the main frame and passing through the slots 18 in the uprights, said pins being headed beyond the uprights. The relatively forward edge of each upright is formed with a series of teeth 21, and the shaft 15 is provided adjacent each end with a gear 22 arranged to engage the teeth 21. The shaft 15 is centrally provided with a hand wheel 23, whereby said shaft may be conveniently operated to adjust the platform, a seat 24 being supported on the main frame in rear of the shaft 15 for the convenience of the operator. The relatively forward end of the platform is supported through the medium of a link 25 of approximately U-form, centrally and pivotally connected to the boxing for the forward axle, with the ends pivotally connected to the side bars of the platform, said side bars being preferably extended forwardly and upwardly beyond the plane of the remaining bars to provide for such pivotal connection and also to afford side walls 26 for the platform.

Between the shaft 15 and the platform 16 are arranged the stone feeding members, comprising a pair of shafts 27—28 arranged in horizontal alinement and each formed adjacent each end with crank portions 29, the crank portions of each shaft projecting in opposite directions, whereby the longitudinally alined crank portions of both shafts will project in the same direction. Shafts 27 and 28 are mounted in suitable hanger bearings 28' depending from the side bars 1. The feeding members proper comprise bars 30, which are movably supported on the alined crank portions of the respective shafts, and fingers 31 depending from the forward ends of the bars and terminating in arcuate sections 32 designed to overlie the platform and, in the operation of the shafts, move longitudinally of the platform to force the stones resting thereon in the relatively rearward direction.

A shaft 33 is rotatively supported at the rear end of the platform, said shaft being provided adjacent each end with a sprocket wheel 34. Endless sprocket chains 35 are arranged to travel over the wheels 34, the opposite ends of said chains being arranged to travel on the sprocket wheels 36, mounted upon a shaft 37, supported in bearings rising from the side bars of the main frame above the rear axle. The chains 35 are connected by transversely disposed bars 38, thus providing an endless carrier leading from the rear end of the platform 16. The relatively lower ends of the uprights 17 of the directing platform are pivotally mounted upon the ends of the shaft 33 beyond the sprocket wheels 34, and the bars 16 are thereby maintained in approximate alinement with the upper surface of the endless carrier, as clearly shown in Fig. 1. The sprocket chains, or carrier, are driven through a gear wheel 39 fixed on the axle 6 and meshing with a gear 40 fixed on the shaft 37, while the shafts 27 of the feeding members are driven through the medium of a sprocket chain 41 engaging a sprocket wheel 42 on the shaft 37 and a sprocket wheel 43 on one of the shafts 27, both of the shafts 27 being provided with additional sprocket wheels 44 connected by a sprocket chain 45.

The rear cross bar 3 of the frame is downwardly and rearwardly inclined on the upper surface, and to this surface is secured a box or receptacle 46, open at the forward end with its bottom so disposed as to receive the material from the carrier. The box 46 is preferably in the form of an ordinary wagon body, having a movable end gate, so that the material deposited in the box may be readily dumped as desired.

Assuming the parts constructed and arranged as described, the operation of my improved stone digging machine is as follows: In the forward travel of the machine the diggers 13 operate to displace the stones from the ground, the independent mounting of these diggers permitting their ready adjustment to compensate for any irregularities of the surface over which they are traveling. The stones dislodged by the diggers are picked up by the fingers 16 of the platform, it being understood that said platform inclines slightly upwardly and rearwardly with its forward end normally in contact with the ground. The operator, through use of the hand wheel 23, may adjust the platform to compensate for any irregularities in the surface of the ground and insure the picking up of all stones dislodged by the diggers. The feeding fingers operate to force the stones longitudinally of the platform and onto the carrier, through which they are carried rearwardly and deposited in the box 46.

From the construction described it will be obvious that the machine of this invention is adapted to automatically take up any stones usually found in a field and transport the same to any desired place of refuse, thus clearing the ground for cultivation in the usual manner. Through the use of the clutches 7 no movement is imparted to the operating parts in the rearward movement of the machine, while by the use of the wheel 23 the operator may readily elevate the platform from contact with the ground when not desired for use.

Having thus described the invention what is claimed as new, is:—

A digging machine comprising a main frame, ground wheels supporting the frame, a shaft mounted adjacent and above the rear ground wheels, means for driving said shaft from the ground wheels, guide pins secured to the frame at the opposite sides thereof, a platform slidably mounted on the guide pins, a shaft mounted at the rear end of the platform, spaced sprocket chains operable on the platform shaft and on the shaft arranged above the ground wheels, bars arranged transversely of the frame and connecting the respective sprocket chains to provide a carrier, spaced shafts supported by the frame above the platform, each of said shafts being provided adjacent one end with a sprocket wheel, a sprocket chain connecting said sprocket wheels, a drive chain leading from the shaft above the rear drive wheels to one of said spaced shafts whereby to operate both of said spaced shafts from the ground wheels, each of said spaced shafts being formed intermediate its ends with relatively opposed crank portions, the corresponding crank portions of the respective shafts extending in the same direction in longitudinal alinement, a single bar engaging the alined crank portion of both shafts, the forward end of said bar being provided with an integral depending portion projecting toward the platform and having an arcuate terminal formation, a hanging connector between the forward end of the platform and the adjacent end of the main frame, and a series of independently movable digging fingers carried by the main frame in advance of the forward end of the platform.

In testimony whereof I affix my signature in presence of two witnesses.

JOHN S. RICHARDS.

Witnesses:
  WM. P. WRIGHT,
  BEN R. WESCOTT.